No. 666,244. Patented Jan. 15, 1901.
J. GALLAND.
THRESHING MACHINE.
(Application filed Jan. 26, 1899.)
(No Model.) 2 Sheets—Sheet 1.
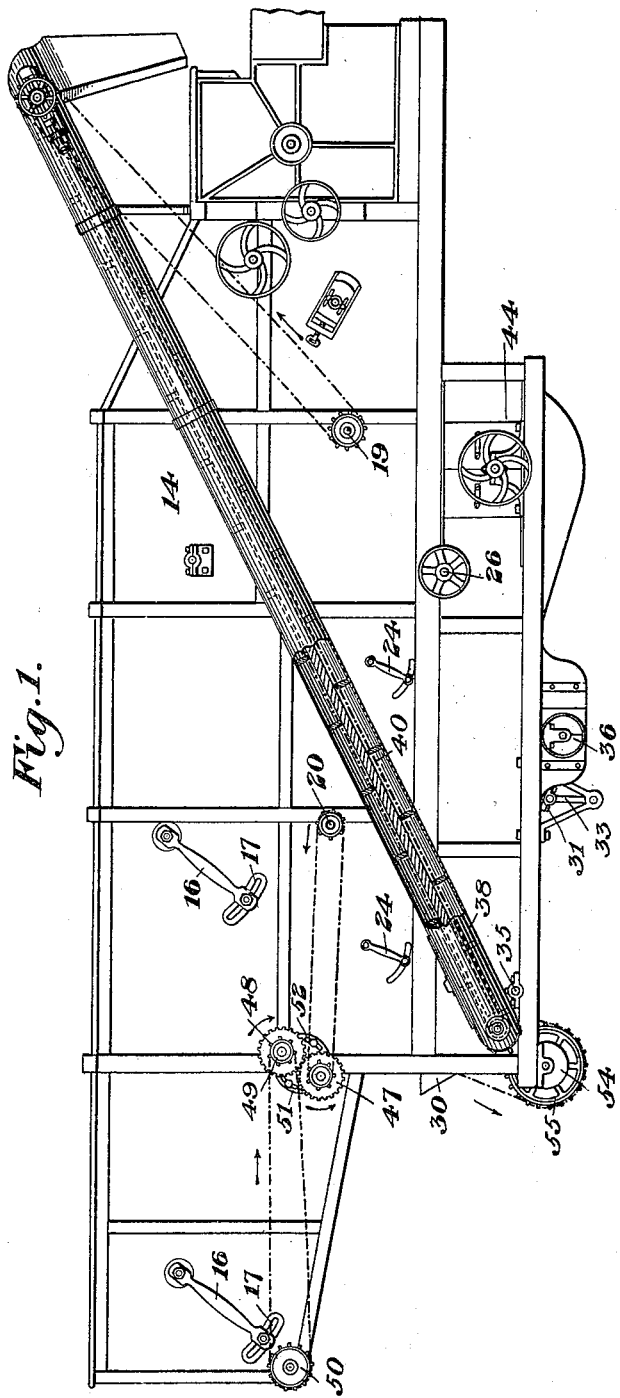
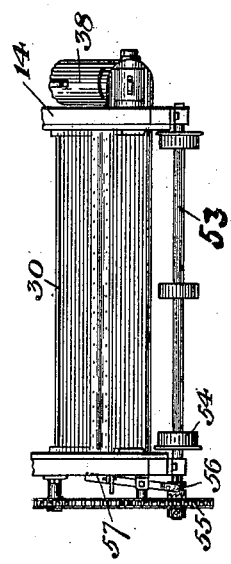
WITNESSES
INVENTOR

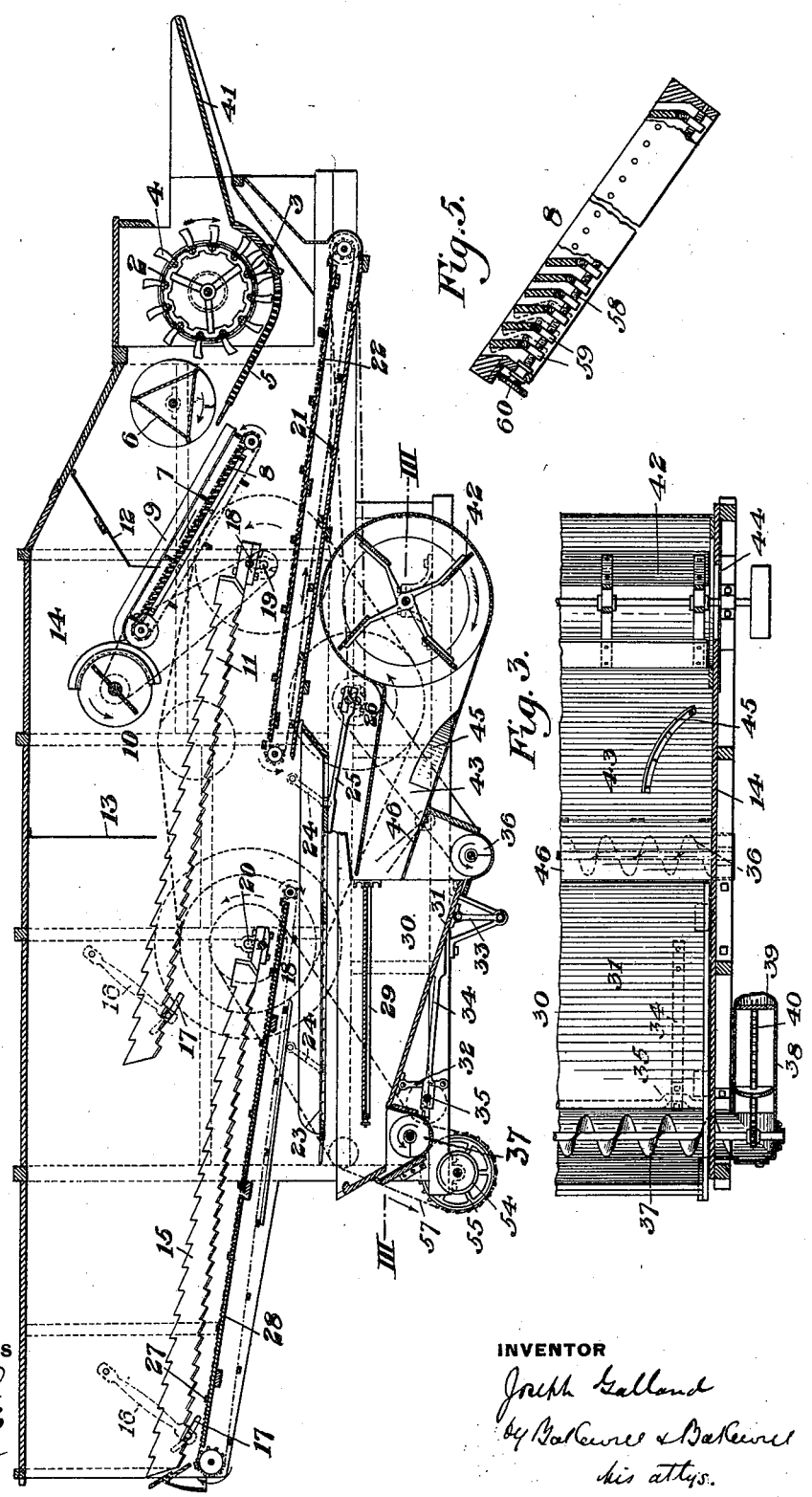

United States Patent Office.

JOSEPH GALLAND, OF MANSFIELD, OHIO, ASSIGNOR TO THE AULTMAN & TAYLOR MACHINERY COMPANY, OF SAME PLACE.

THRESHING-MACHINE.

SPECIFICATION forming part of Letters Patent No. 666,244, dated January 15, 1901.

Application filed January 26, 1899. Serial No. 703,442. (No model.)

*To all whom it may concern:*

Be it known that I, JOSEPH GALLAND, of Mansfield, in the county of Richland and State of Ohio, have invented a new and useful Improvement in Threshing-Machines, of which the following is a full, clear, and exact description, reference being had to the accompanying drawings, forming part of this specification, in which—

Figure 1 is a side elevation, partly broken away, of my improved threshing-machine. Fig. 2 is a longitudinal section of the same. Fig. 3 is a partial horizontal section on the line III III of Fig. 2. Fig. 4 is a detail end view showing the stacker-belt-driving mechanism, and Fig. 5 is a broken detail view showing the means for adjusting the grates.

My invention relates to threshing-machines, and is designed to improve their operation, simplify the mechanism, and prevent bruising of the grain being threshed; also, to decrease weight and improve capacity of the machine.

In the drawings, 2 represents the usual threshing-cylinder, and 3 the concave therefor, these parts being provided with the usual teeth 4. From the concave the grain and straw pass up the inclined grate 5, the grain which has been hulled dropping through this grate, while the remainder is acted upon by a rotatory beater 6, preferably of triangular form, which throws the material upon a raddle 7, which carries the same upwardly along the inclined stationary grating 8. The raddle 7 moves between the grating and suitable guides 9 and delivers the material to a rotary beater 10, which consists of a shaft having two blades. This beater loosens up the straw and grain and delivers the same to a straw-shaker 11 of ordinary slatted construction. To check the material and direct it upon the raddle 7 and the straw-shaker, I employ check-aprons 12 and 13, located above these parts and secured to the inclosing case 14. The straw-shaker 11 feeds the straw and material forward to a similar straw-shaker 15, which leads to the stacker, (not shown,) and both shakers are hung at one end upon links 16, pivotally supported upon the outside of the case 14 and connected to the ends of the shaker through curved slots 17, as shown in Figs. 1 and 2. The other ends of these shakers are provided with bearings for crank-arms 18 upon shafts 19 and 20, respectively, the shakers thus being given an orbital movement, which carries the material forward toward the outlet. The grain which falls through the grating 5, the grating 8, and the front portion of the shaker 11 drops through a raddle 21 onto a tight floor 22, which is slightly inclined, the grain being carried up this floor by the bars of the raddle, which slide thereon. The grain thus carried up the floor 22, as well as that dropping through the rear portion of the shaker 11 and that dropping through the shaker 15, is fed to a shaking chaffer 23, hung on links 24 and actuated by the pitman connection 25 from the shaft 26. The grain which falls through the shaker 15 is carried to the chaffer by a raddle 27, moving over the downwardly-inclined floor 28. The short straw, chaff, and refuse which fall through the shakers 11 and 15 pass along the chaffer 23 and are delivered onto the straw-stacker proper. The grain dropping through the chaffer, which may be of any usual construction, falls upon a sieve 29, carried in a shaking shoe 30, having an inclined bottom 31. This shoe is carried upon links 32 and 33, secured to the frame of the machine, and is actuated by pitman connections 34 from a crank-shaft 35, and the clean grain sliding down its sloping bottom is fed to the grain-auger 36, which carries it out in the usual manner. The grain and chaff not passing through the sieve 29 drop from its rear end upon an auger 37, which feeds the same outwardly into the lower end of the inclined elevator 38, which consists of a sheet-iron tube having an intermediate partition 39 extending longitudinally thereof. Through this elevator moves the endless carrier 40, having blades which carry the material upwardly to the upper end of the elevator, where it drops upon the feed-board 41 in front of the threshing-cylinder.

The usual fan 42 is employed, which directs a blast through the throat 43 to the lower side of the sieve 29 and the chaffer 24, the end inlet to this fan being controlled by a suitable adjustable gate 44. To concentrate the blast upon the central portion of the sieve, I provide a pair of blast-guides 45, which are adjustably secured to the floor of the throat and may be located as desired to regulate and direct the blast. To adjust the direction of the blast, I provide in the end portion of the throat a vertically-swinging wind-board 46, which may be adjusted to the various positions indicated in Fig. 2 by a hand-wheel applied to its shaft.

The various shafts are driven in the direction shown by the arrows upon Figs. 1 and 2 by the chain connections passing over the chain-wheels, both indicated in dotted lines to avoid confusion upon the drawings. By the use of these chains and chain-wheels I obtain loose driving connections which give ease of motion and prevent the binding action heretofore common in these threshers. To drive the raddle 27 inwardly, so as to carry the grain and chaff dropping thereon to the chaffer, I employ the two intermeshing gear-wheels 47 and 48, the shaft of the wheel 47 having a chain-wheel connected to the chain-wheel 48 upon shaft 20, while a similar chain-wheel 49 upon the shaft of gear-wheel 48 is connected to the driving chain-wheel 50 of the raddle. The stud-shafts of the wheels 47 48 are both mounted in a plate 51, which may be swung upon its center and held in adjusted position by bolts passing through arc-shaped slots 52 therein, thus simultaneously tightening both chains.

The stacker (not shown) is hung upon a shaft 53 at the lower rear end of the frame, this shaft having belt-wheels 54 to drive the stacker. A chain-wheel 55 is loosely mounted upon this shaft, and a jaw-clutch 56, splined to the shaft, may be operated by hand-lever 57, so as to connect or disconnect the stacker from the driven wheel 55, as may be desired.

To vary the openings in the grates in the rear of the threshing-cylinder and between the two beaters, I preferably use swinging slats, as shown in Fig. 5, mounted on end trunnions, these slats swinging so as to adjust the openings and being held in adjusted position by the rod 58 passing through link extensions 59 and operated by hand-wheel 60.

The advantages of my invention will be apparent to those skilled in the art. The grate directly under and back of the threshing-cylinder allows any threshed grain to drop through at this point and be carried to the sieve. The raddle between the two beaters also gives important advantages, especially in connection with the grate at this point, in giving a perfect and rapid separation of the grain from the straw. The cylindrical elevator with the half-circle bucket is a cheap and efficient construction, the driving connections for the straw-shakers are novel and do away with the necessity for pitman-rod connections, and the fan-blast guides serve to greatly increase the efficiency of the blast.

Many variations may be made in the form and arrangement of the parts without departing from my invention.

I claim—

1. In a thresher, the combination with a threshing-cylinder, of a concave therefor, an upwardly-inclined grate leading from the concave, a rotary beater above the grate, a separate upwardly and rearwardly inclined open grate in the rear of the beater, and having adjustable transverse slats, mechanism for adjusting the spaces between the slats, a raddle which travels over the slatted grate in the upper part of its path, and carries the straw up the grate, and a tight floor beneath the adjustable open grate; substantially as described.

2. In a thresher, the combination with a threshing-cylinder having a rotary beater in the rear of it, an upwardly and rearwardly inclined open grate leading from the beater and having adjustable transverse slats, mechanism for adjusting the spaces between the slats, a raddle which travels over the slatted grate in the upper part of its path and moves the straw up along the grate, a tight floor beneath the slatted grate, a cleaner to which the floor leads, and a raddle traveling over the floor; substantially as described.

In testimony whereof I have hereunto set my hand.

JOSEPH GALLAND.

Witnesses:
   J. E. BROWN,
   IDA ACKERMAN.